United States Patent [19]
Shioda et al.

[11] 3,759,042
[45] Sept. 18, 1973

[54] LIQUID PRESSURE DRIVING DEVICE

[75] Inventors: Shigeru Shioda, Minata-ku, Tokyo;
Fumio Ogasahara, Matsudo-shi;
Minoru Otomo, Ichikawa-shi, all of
Japan

[73] Assignee: Kayaba Kogyo Kabushiki Kaisha,
Tokyo, Japan

[22] Filed: May 14, 1971

[21] Appl. No.: 143,457

[30] Foreign Application Priority Data
May 15, 1970 Japan.................................. 45/40891

[52] U.S. Cl........................... 60/483, 60/905, 60/435
[51] Int. Cl............................................. F16h 39/02
[58] Field of Search ............. 60/53 WW, 53 R, 483,
60/484, 905, 435

[56] References Cited
UNITED STATES PATENTS
3,057,161  10/1962  Henke et al......................... 60/53 C
3,348,624  10/1967  Just et al.............................. 60/53 R
3,473,442  10/1969  Farmer et al. .................. 60/53 R X Primary Examiner—Edgar W. Geoghegan
Attorney—Otto John Munz

[57] ABSTRACT

A liquid pressure driving device for selective change of the rotary speed of a load member within its allowable output torque, which permits a change in a speed ratio from several to ten times or more between low and high speeds by use of a plurality of liquid pressure motors which are coupled to the load member which and are separated into individual pairs with a different displacement per revolution of the load member with such an arrangement as to make it possible to change connections of such liquid pressure motors in one of such pairs in either the forward or the reverse direction.

9 Claims, 16 Drawing Figures

Patented Sept. 18, 1973

SHIGERU SHIODA
FUMIO OGASAHARA
MINORU OTOMO

INVENTORS

BY *(signature)*

ATTORNEY

SHIGERU SHIODA
FUMIO OGASAHARA
MINORU OTOMO

INVENTORS

SHIGERU SHIODA
FUMIO OGASAHARA
MINORU OTOMO

INVENTORS

SHIGERU SHIODA
FUMIO OGASAHARA
MINORU OTOMO

INVENTORS

BY *[signature]*

ATTORNEY

SHIGERU SHIODA
FUMIO OGASAHARA
MINORU OTOMO
INVENTORS

ATTORNEY

SHIGERU SHIODA
FUMIO OGASAHARA
MINORU OTOMO

INVENTORS

SHIGERU SHIODA
FUMIO OGASAHARA
MINORU OTOMO

INVENTORS

BY *Otto John Munz*

ATTORNEY

SHIGERU SHIODA
FUMIO OGASAHARA
MINORU OTOMO

INVENTORS

SHIGERU SHIODA
FUMIO OGASAHARA
MINORU OTOMO

INVENTORS

SHIGERU SHIODA
FUMIO OGASAHARA
MINORU OTOMO
INVENTORS

SHIGERU SHIODA
FUMIO OGASAHARA
MINORU OTOMO

INVENTORS

BY *Otto John Munz*

ATTORNEY

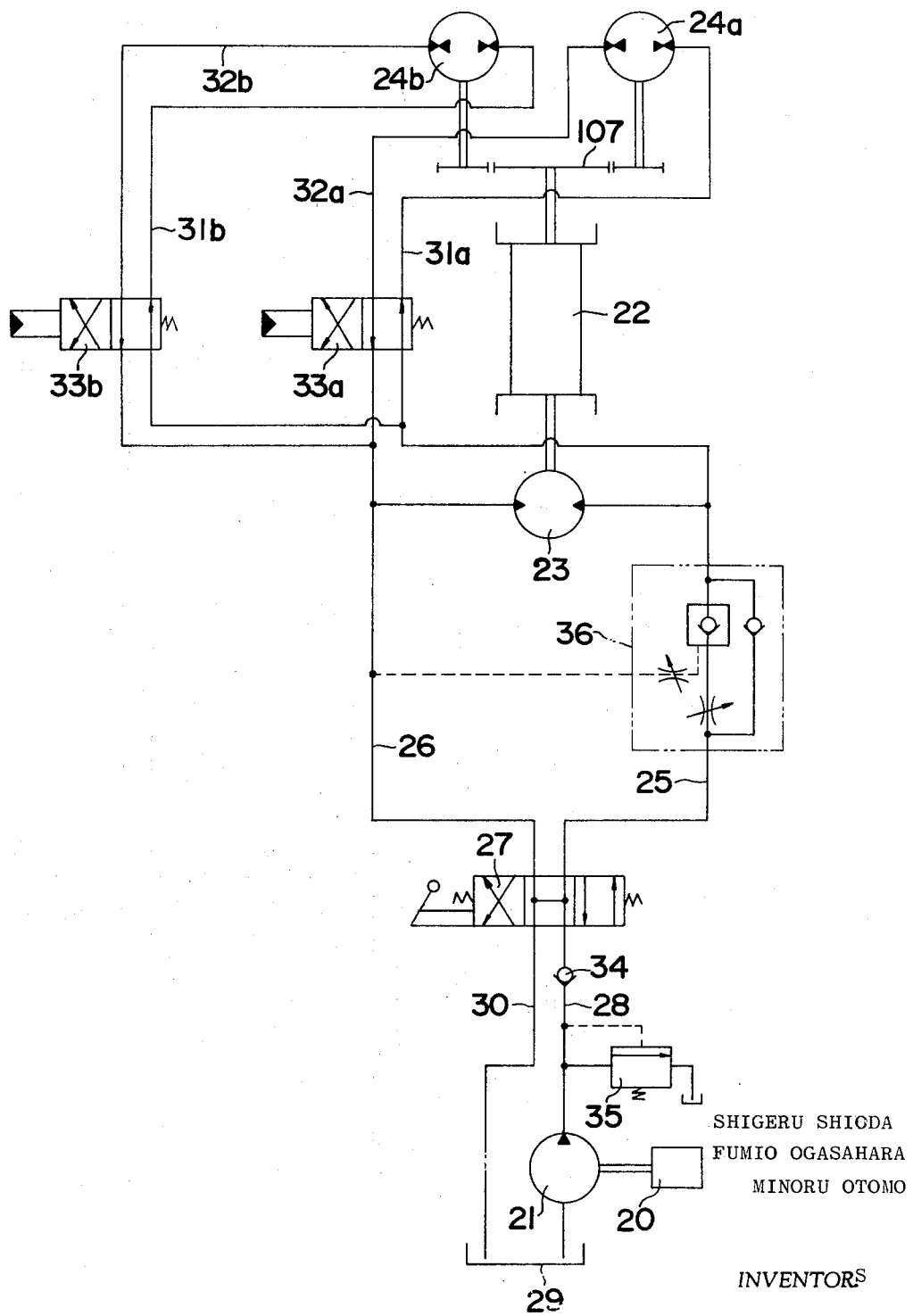

LIQUID PRESSURE DRIVING DEVICE

BACKGROUND OF THE INVENTION

This invention relates to a liquid pressure driving device comprising in combination a liquid pressure pump and liquid pressure motors, and more particularly to such a liquid pressure driving device which is especially applicable to winches or transmissions.

Generally in prior-art liquid pressure driving devices of this kind, volumes of the liquid pressure pump and motors are determined from the factors of maximum allowable load and desired rotary speed at the time of its application. This means that the output torque becomes too high when a light load is applied. Thus, there is often a need to change the rotary speed with the application of a light load or to determine the desired rotary speed under the maximum allowable load or higher. In conventional liquid pressure driving devices two liquid pressure motors are employed in combination with a single liquid pressure pump through a two position valve and then coupled to a load member common thereto. When a heavy load is applied, the two motors are connected in parallel with the pump for achieving a low-speed high-torque operation. On the other hand, when a light load is applied, the two motors are connected in parallel or in series with the pump by means of the two position valve for changing the rotary speed. In the alternative, the two motors connected in parallel with respect to the pump may be operated at idle speed. Accordingly, it is in prior art devices possible to produce a high rotary speed which is only about two times the low rotary speed due to the functional limitation of the conventional devices. For achieving any higher ratio, such prior-art devices must necessarily be more complicated which results in greater difficulties in the manufacture, higher cost, and more frequent faults.

SUMMARY OF THE INVENTION

The primary object of this invention is to provide a novel liquid pressure driving device, which is simple in structure and which is capable of changing the rotary speed from several to ten times or even higher. The device of this invention features a plurality of liquid pressure motors coupled to a load member common thereto which are used in combination with a liquid pressure pump and separated into individual pairs with a different displacement per revolution of the load member. Thereby the liquid pressure motors in such individual pairs may be used in parallel with the liquid pump at the time of low-speed operation for both heavy and light loads just as in conventional devices. Further, at the time of high-speed operation with only a light load such liquid pressure motors in order have a smaller displacement may be easily changed over for reverse connections. Thus, the present liquid pressure driving device provides a higher operating rotary speed which may vary from several to 10 times the lower speed.

The above and other objects and features of this invention will be better understood from the following description with reference to the accompanying drawings.

BRIEF DESCRIPTION OF THE DRAWINGS

FIGS. 14, 15 and 16 are liquid pressure circuit diagrams showing other embodiments of similar three-speed change type liquid pressure driving devices of this invention.

DESCRIPTION OF THE PREFERRED EMBODIMENT

As already mentioned above, a liquid pressure driving device of this invention may be used as various types of driving means for winches, transmission gears and the like. For convenience of explanation it will be described here as a driving means for winches.

Figure 1:
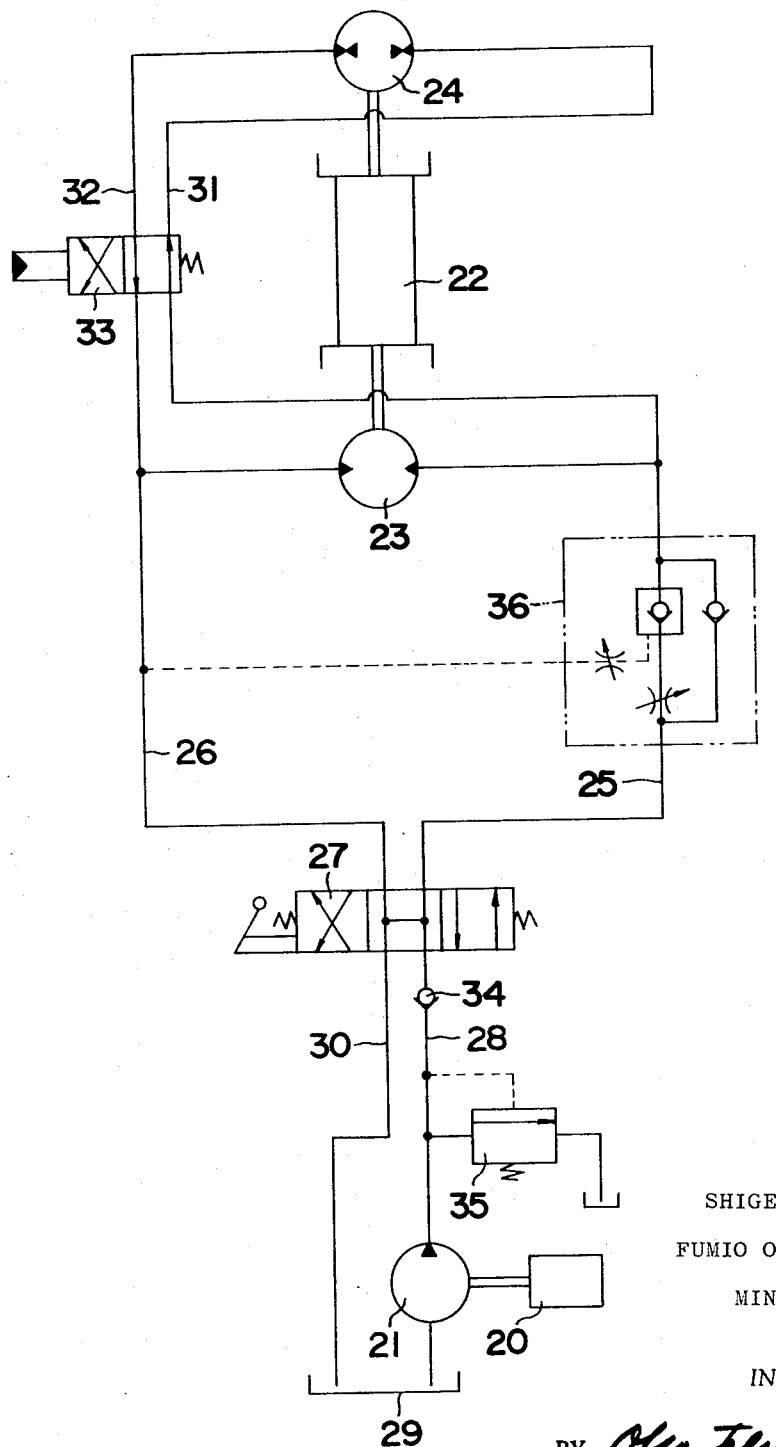
FIG. 1 is a liquid pressure circuit diagram of a two-speed change type liquid pressure driving device.

FIG. 1 is a liquid pressure circuit diagram showing one embodiment of the liquid pressure driving device of this invention for winch use. This device consists of a liquid pressure pump 21 driven and rotated by means of a suitable power source 20 such as electric motor, or an internal combustion engine, or steam engine and of two liquid pressure motors 23 and 24 in combination which are coupled to a winding drum 22 as a load member. The said two liquid pressure motors 23 and 24 are thus separated into two systems. In other words, one liquid pressure motor 23 is so arranged as to communicate selectively with a liquid feeding circuit 28 connected to the liquid pressure pump 21 through main circuits 25 and 26 via a control valve 27 or with a liquid drain circuit 30 that is connected to a reservoir 29, while the other liquid pressure motor 24 is so arranged as to communicate selectively with said main circuit 25 or 26 similarly through circuits 31 and 32 via a two position or change-over valve 33. With such arrangement it will be readily understood that the direction of rotation of the liquid pressure motor 23 can be changed by change-over or reverse operation of the control valve 27, and that the liquid pressure motor 24 can be controlled as desired so as to be rotated in the direction same as or reverse to the direction in which the liquid pressure motor 23 is rotated by the change-over or reverse operation of the two position valve 33. In the liquid feeding circuit 28 a check valve 34 is provided for preventing operating liquid from flowing back to the liquid pressure pump 21 and a relief valve 35 for limiting the maximum applicable pressure of the operating liquid while in operation. The valves 34, 35 serve to protect such circuits and systems from any possible damage due to abnormal high pressure which may be produced therein. In addition, since this embodiment is used for a winch a winch valve 36 is provided in the main circuit 25 for winding operation. The winch valve 36 operates so as to prevent the winding drum 22 from spontaneous rotation in its unwinding direction due to any load applied thereto, when the load is kept stationary in any specific position after its lifting thereto by means of the winding drum 22.

In FIG. 1 the two liquid pressure motors 23 and 24 are coupled separately to the winding drum 22. Instead of such arrangement, the liquid pressure motors 23 and 24 in a double-combined manner may be coupled to the winding drum 22. In FIGS. 2 to 8 there is shown one form of a double star-shaped liquid pressure motor including a two position valve 33. The motor comprises a motor casing 39 wherein cylinders 37 and 38 are disposed radially in pairs in a parallel arrangement and a valve casing 43 wherein pistons 40 and 41 are inserted into such cylinders 37 and 38 respectively. Further, said motor includes the two position valve 33, and a rotary valve 42 that is adjacent to one side of the motor casing 39. The motor casing 39 has a crank shaft 47 that is supported on roller bearings 45 and 46 which are mounted on a cap 44 that is engaged securely with one end thereof and on the inner end of the valve casing 43, respectively. The crank shaft 47 extends outwardly at one end of the motor casing 39 through the roller bearing 45 on said cap 44, and is provided with a key 48 set thereon so as to form an output shaft 49. The crank shaft 47 is coupled at the other end to the rotary valve 42 in the valve casing 43 through an Oldham's coupling 50. These members are so related as to rotate together in unison.

Said crank shaft 47 is also provided with two crank pin sections 51 and 52 that are disposed eccentrically with a phase difference of 180° in the motor casing 39. Connecting rods 53 and 54 are provided in contact at their base ends with the outer surface of said crank pin sections 51 and 52. The connecting rods 53 and 54 are held at their base ends in guide rings 57 and 58 which are secured by snap rings 55 and 56 on the crank pin sections 51 and 52 respectively so as to slide at the base ends on the outer surface of the crank pin sections 51 and 52 in contact therewith all the time that there is relative motion therebetween. On the other hand, the connecting rods 53 and 54 which have spherical portions 59 and 60 at there respective ends, which are inserted and held in the lower recessed portions of the pistons 40 and 41 of said cylinders 37 and 38, respectively in such a manner that they turn through snap rings 63 and 64 and collars 61 and 62 that are mounted on the pistons 40 and 41. Thus, with the reciprocating movements of pistons 40 and 41 in cylinders 37 and 38, respectively, operating at a fixed phase difference, the crank shaft 47 is rotated through the corresponding connecting rods 53 and 54 and the crank pin sections 51 and 52. The turning effort or torque thus produced is generated outwardly through the output shaft 49. In this manner the double star-shaped liquid pressure motors 23 and 24 are formed integrally inside the motor casing 39. The rotary valve 42 as previously mentioned serves to give uniform reciprocating movements to the individual pistons 40 and 41. The rotary valve 42 is illustrated in detail in FIGS. 4 to 8. As will be clear from the drawings, the rotary valve 42 has on its outer surface annular grooves 65, 66, 67 and 68 and semi-annular grooves 71a, 71b, 72a and 72b through which respective sets of grooves are separated into two portions by separating walls 69 and 70 with a valve hole 73 provided in the center thereof. The rotary valve also has on its inner surface annular grooves 74, 75, 76 and 77. Said semi-annular groove 71a connects with the annular grooves 65 and 74 via through holes 78 and 79, while the semiannular groove 71b opposite thereto connects with the annular grooves 66 and 75 via through holes 80 and 81. The semi-annular groove 72a connects with the annular groove 76 via through hole 82, while the semi-annular groove 72b connects with the annular groove 77 via through hole 83.

Figure 4:
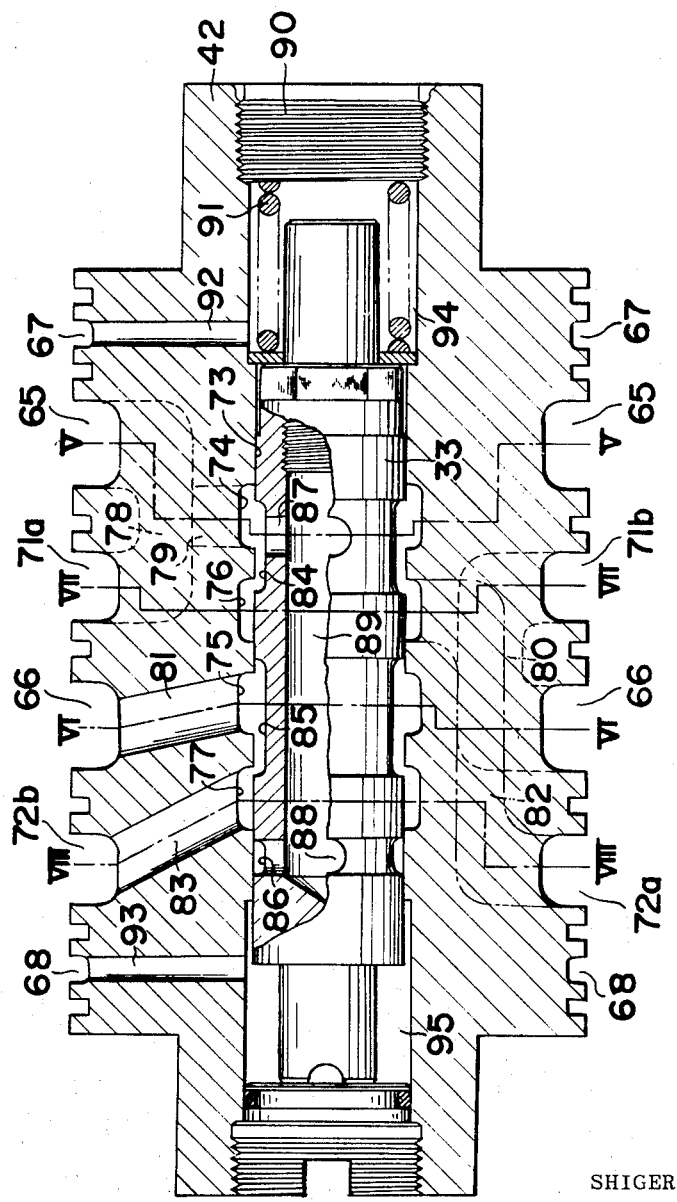
FIG. 4 is an enlarged front view in vertical section of a rotary valve for the same motor.
Figure 5:
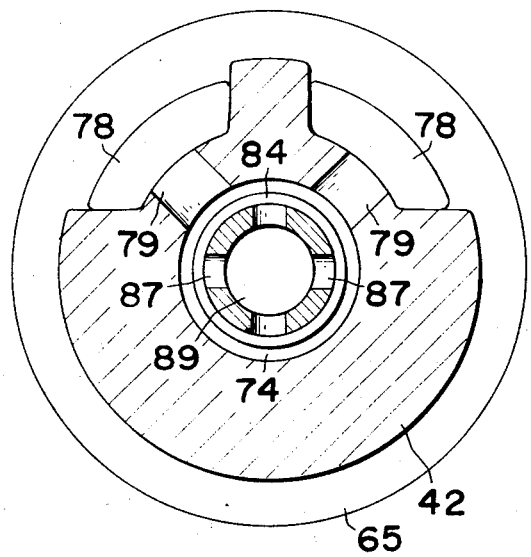
FIGS. 5, 6, 7 and 8 are side views in vertical section of the rotary valve taken along lines V—V, VI—VI, VII—VII and VIII—VIII in FIG. 4.
Figure 6:
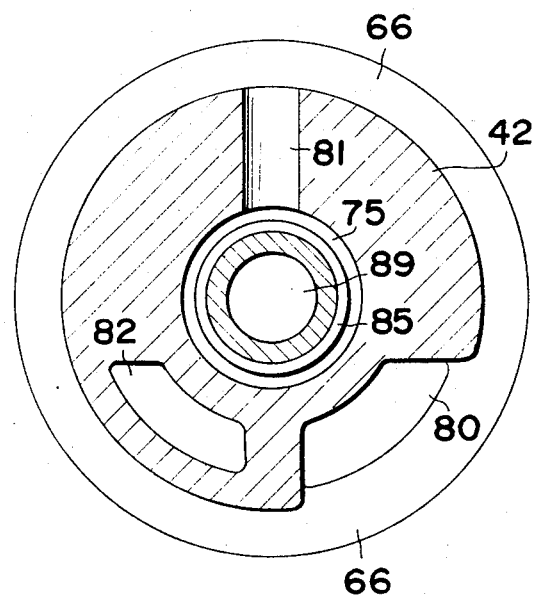
Figure 7:
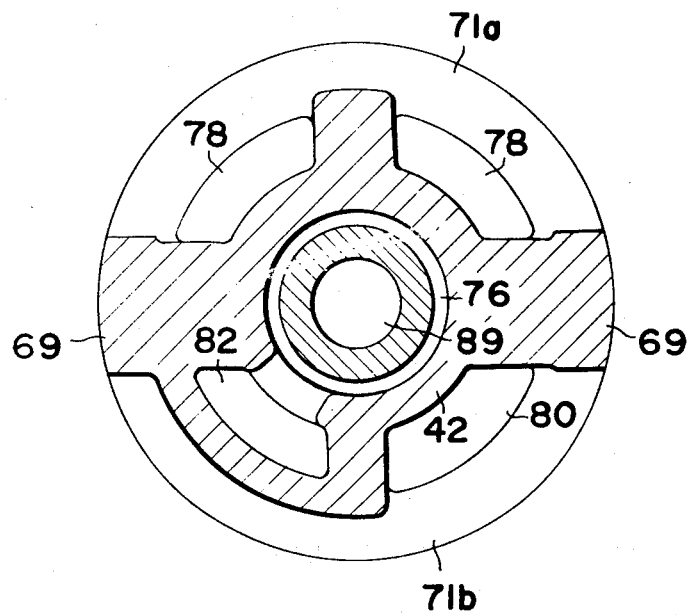
Figure 8:
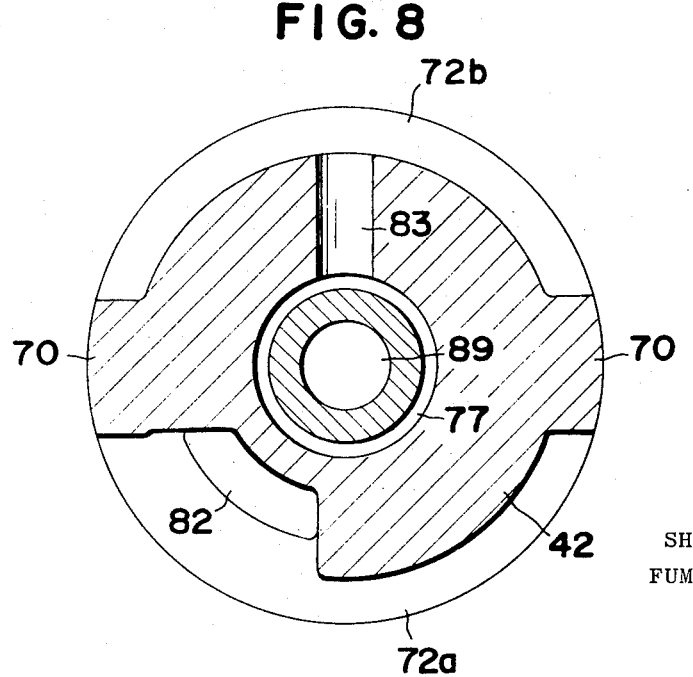

The rotary valve 42 includes the two position valve 33 which is slidably mounted in the valve hole 73 that is constructed in the center of said rotary valve 42. On the other surface of the two position valve 33 are formed annular grooves 84, 85 and 86. The annular grooves 84 connects with each other via through holes 87 and 88 and a center hole 89. The rotary valve 33 and the valve hole 73 are closed at their right ends and kept in such a position as shown in FIG. 4 by the force of a spring 91 that is provided between the right ends thereof and a cap 90 that is screwed into the rotary valve 42 at its right end. Under this condition the annular grooves 74 and 76 and the annular grooves 75 and 77 connects through the annular grooves 84 and 85 respectively. The semi-annular groove 72a connects with the annular groove 65 via through hole 82, annular groove 76, annular groove 84, annular groove 74, through hole 79, through hole 78. The semi-annular groove 72b connects with the annular groove 66 via through hole 83, annular groove 77, annular groove 85, annular groove 75 and through hole 81. On the other hand, when the two-way valve 33 is moved to the right against the force of the spring 91 from its initial position, the annular grooves 74 and 75 and the annular grooves 75 and 77 are disconnected from each other, while the annular grooves 75 and 76 are connected through the annular groove 85. At the same time the annular groove 86 is opened to connect with the annular groove 77, when the semi-annular groove 72a is connected with the annular groove 66 via through hole 82, annular groove 76, annular groove 85, annular groove 75, through hole 81, while the semi-annular groove 72b connects with the annular groove 65 via through hole 89, through hole 87, annular groove 84, annular groove 74, through hole 79 and through hole 78. For such two position operation of the rotary valve 33 the annular grooves 67 and 68 formed on the rotary valve 42 are so designed as to connect with chambers 94 and 95 that are separated at the right and left side of the valve 33 via through holes 92 and 93. Thus, as long as both of the chambers 94 and 95 are connected with the reservoir via through holes 92 and 93 and the annular grooves 67 and 68, the valve 33 may be held in the position shown in FIG. 4 by the force of the spring 91. The valve 33 may be moved to the right with a pilot pressure applied only to the left chamber 95 through the annular groove 68 and the through hole 93.

Figure 2:
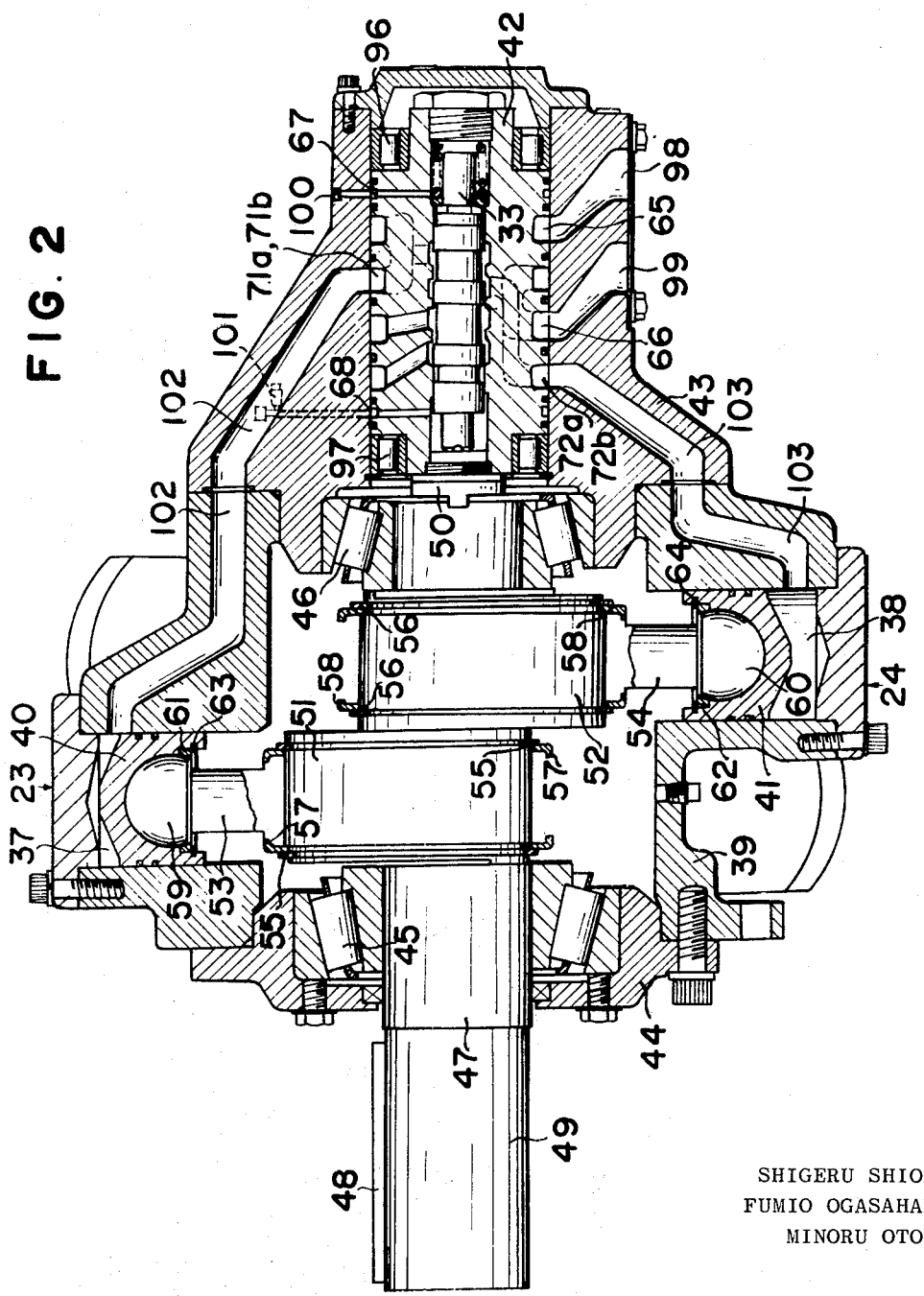
FIG. 2 is a front view in vertical section showing one form of a liquid pressure motor used preferably in the circuit of FIG. 1.
Figure 3:
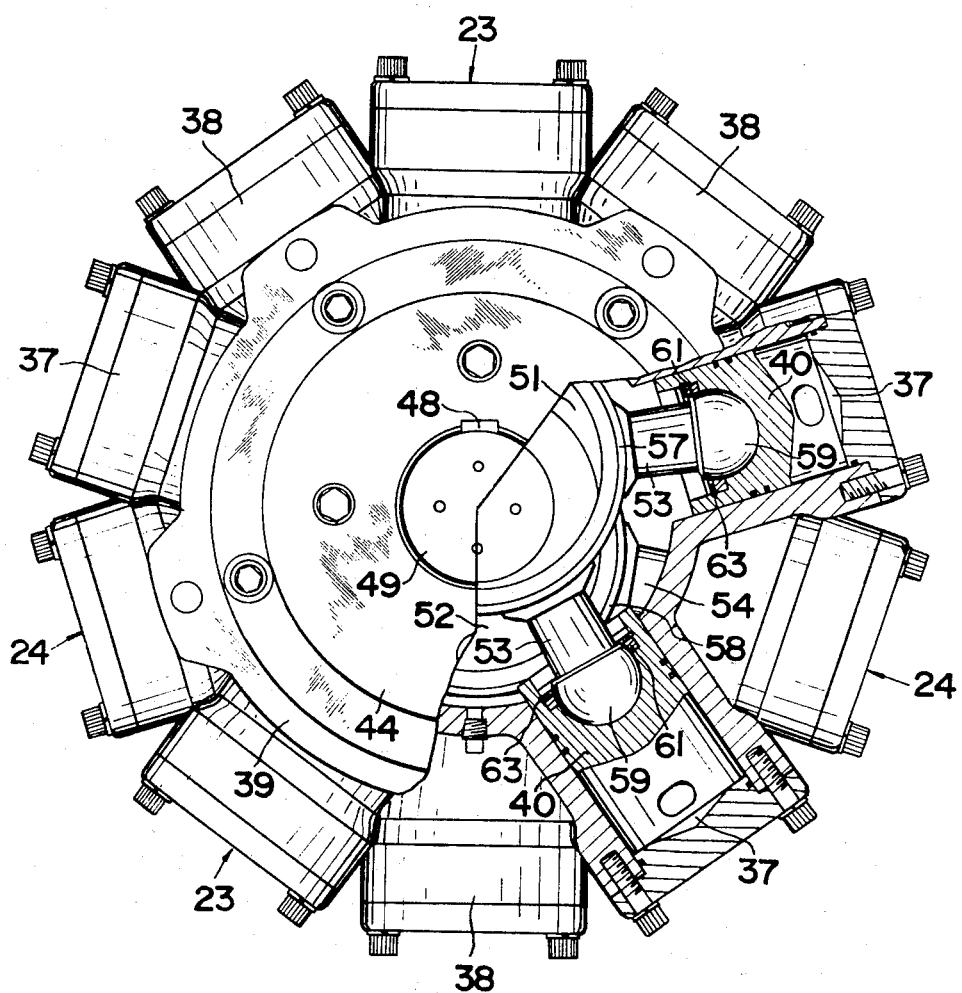
FIG. 3 is a side view partly in section of the same motor.

The rotary valve 42 in cooperation with the valve 33 thus constructed is then rotatably mounted in said valve casing 43 on the roller bearing 96 and 97 at the both ends, as shown in FIG. 2. The separating walls 69 and 70 to separate the semi-annular grooves 71a and 71b from those 72a and 72b are coupled to the crank shaft 47 through the Oldham joint 50 in such a manner as to be kept in phase with the crank pin sections 51 and 52. Furthermore, under this condition the annular grooves 65 and 66 on the rotary valve 42 communicate with ports 98 and 99 that are formed in the valve casing 43, while the annular grooves 67 and 68 communicate with pilot ports 100 and 101. At this time through holes 102 and 103, which lead from the individual cylinders 37 and 38 to the motor casing 39 and the valve casing 43, are open to the semi-annular grooves 71a, 71b and 72a, 72b.

Now, when the pressure operating liquid flows through the port 98 into the two position valve 33 that is held in the left position with the port 99 being opened to the reservoir, the liquid flows to the cylinders 37 and 38 in the down stroke of the pistons of the liquid pressure motors 23 and 24 through annular groove 65, through hole 78, semi-annular groove 71a, annular groove 84, annular groove 76, through hole 79, annular groove 74, annular groove 84, annular groove 76, through hole 82, semi-annular groove 72a, through hole 103. On the other hand, internal operating liquid in the cylinders 37 and 38 on the up stroke of the pistons is discharged similarly to the reservoir from the through hole 102 through semi-annular groove 71b, through hole 80, annular groove 66 and port 99, and from the through hole 103, through semi-annular groove 72b, through hole 83, annular groove 77, annular groove 85, annular groove 75, through hole 81, annular groove 66, port 99 respectively. Consequently the liquid pressure motors 23 and 24 act as motors to drive and rotate the crank shaft 47 in the desired direction. Such relations are always maintained, because the rotary valve 42 is rotated together with the crank shaft 47 through the Oldham's joint 50, and thus the crank shaft 47 continues to rotate. When the pressure operating liquid flows to the port 99 by opening the port 98 to the reservoir, the crank shaft 47 is rotated in reverse with respect to the motor action of the liquid pressure motors 23 and 24 previously described. Thus, if only the two position valve 33 is kept in the left position, the direction of rotation of the crank shaft 47 can be controlled by selective feeding of the pressure operating liquid to the ports 88 and 89 with the liquid pressure motors 23 and 24 still performing their respective essential motor actions.

On the other hand, when the pressure operating liquid flows selectively to either port 98 or 99 after the two-way valve 33 has been moved to the right position by the application of a pilot pressure from the pilot port 101 to the chamber 95, there is no change in the connections of the individual cylinders 37 in the liquid pressure motors 23 with respect to the annular groove 65 and 66 on the rotary valve 42 but only a change in the connections of the individual cylinders 38 in the liquid pressure motors 24. In this case, only the liquid pressure motor 23 performs its proper motor action, while the liquid pressure motor 24 performs a pump action which is reverse to the motor action. Thus, from the above description it will be understood that the foregoing double star-shaped liquid pressure motor can be used directly as a liquid pressure driving device as shown in FIG. 1. That is, the liquid pressure motors 23 and 24 by virtue of the two position valve 33 may connect the ports 98 and 99 to the main circuits 25 and 26 in FIG. 1 respectively and may couple the output shaft 49 to the winding drum 22.

In FIG. 1, assume for illustration purposes only that the active volume of the liquid pressure motor 23 per revolution is $D_1$ and that of the liquid pressure motor 24 per revolution is $D_2$ with a difference existing in capacity therebetween, and that the two position valve 33 is retained in the right position. When the control valve 27 is moved to the right position, both the liquid pressure motors 23 and 24 drive and rotate the winding drum in the winding direction with the pressure operating liquid moving from the liquid pressure pump 21 through the main circuit 25. When the control valve 27 is moved to the left position, both the motors 23 and 24 drive and rotate the winding drum in the direction of unwinding with the pressure operating liquid moving from the liquid pressure pump 21 through the main circuit 26. Then, the torque $T_1$ of the winding drum 3 in such a winding and unwinding operation is given by the formula $$T_1 = 1/2\pi \cdot D_1 \cdot \eta_1 \cdot P + 1/2\pi \cdot D_2 \cdot \eta_2 \cdot P$$
$$= 1/2\pi \cdot (D_1 \cdot \eta_1 + D_2 \cdot \eta_2) \cdot P$$

(a)

where $P$ is the discharge pressure of the liquid pressure pump 21 that is to be determined by the weight of a load applied to the winding drum 22 since these liquid pressure motors 23 and 24 are coupled in parallel to the liquid pressure pump 21; $\eta_1$ the torque efficiency of the liquid pressure motor 23; and $\eta_2$ the torque efficiency of the liquid pressure motor 24. The rpm $N_1$ of the winding drum 22 is given by the formula $$N_1 = \frac{Q}{\frac{D_1}{\eta_3} + \frac{D_2}{\eta_4}}$$

(b)

where Q is the discharge flow per minute of the liquid pressure pump 21; $\eta_3$ the capacity efficiency of the liquid pressure motor 23; and $\eta_4$ the capaciity efficiency of the liquid pressure motor 24.

Next assume that the two position valve 33 has been moved to the left position and then the control valve 27 is activated for its reverse operation. In this case, when the liquid pressure motor 23 is driven to rotate in the direction of winding by changing the control valve 27 over to the right position, the liquid pressure motor 24 is rotated in the reverse direction of the unwinding. When the liquid pressure motor 23 is driven to rotate in the direction of unwinding by changing the control valve 27 over to the left position, the liquid pressure motor 24 is rotated in the reverse direction of winding. Assuming that the output torque of the both liquid pressure motors 23 and 24 are equal and balanced, the winding drum may not be driven to rotate in either direction. If the capacity of the liquid pressure motor 23 and that of the motor 24 are predetermined so as to produce output torques wherein the one of the former is greater than that of the latter, the liquid pressure motor 24 is forced to rotate by the liquid pressure motor 23 in the same direction thereof when the control valve 27 is moved to the right position with the result that the winding drum 22 is driven in the direction of winding. However, when the liquid pressure motor 24 is forced likewise to rotate by the liquid pressure motor 23 in the same direction thereof when the control valve 27 is moved to the left position, the result is to rotate the winding drum in the direction of unwinding.

Now, there will be examined conditions for stopping both the liquid pressure motors 23 and 24. When the liquid pressure motor 24 is being forcibly driven to rotate by the liquid pressure motor 23 in the same direction thereof, the motor 24 may be considered as performing not its primary motor action but a pump action. Assume the pressure at the inlet of the liquid pressure motor 23 under such condition is $P_1$ and the pressure at the outlet of the pressure motor 24 doing the pump action is $P_2$. The output torque $T_3$ of the motor 23 is given by the formula $$T_3 = 1/2\pi \cdot D_1 \cdot P_1 \cdot \eta_1 \tag{c}$$

On the other hand, the input torque $T_4$ of the liquid pressure motor 24 performing the pump action is given by the formula $$T_4 = 1/2\pi \cdot D_2 \cdot P_2 \cdot 1/\eta_2 \tag{d}$$

Thus, the condition for no rotary movement of the two liquid pressure motors 23 and 24 in either direction is obtained by balancing the output torque $T_3$ of the motor 23 with the input torque $T_4$ of the motor 24. Thus, when $T_3 = T_4$ in the formulas (c) and (d). That is, $$D_1 \cdot P_1 \cdot \eta_1 = D_2 \cdot P_2 \cdot 1/\eta_2$$

$$P_1/P_2 = D_2/D_1 \cdot 1/\eta_1 \cdot \eta_2 \tag{e}$$

Furthermore, no rotary movement of the two liquid pressure motors 23 and 24 at the same time means that the pressure $P_1$ at the inlet of the liquid pressure motor 23 becomes equal to the pressure $P_2$ at the discharge side of the liquid pressure motor 24, which communicates therewith through the two position valve 33. In the end, the condition for stopping the liquid pressure motors 23 and 24 is given by the formula $$D_2/D_1 \cdot 1/\eta_1 \cdot \eta_2 = 1 \tag{f}$$

where $p_1/p_2 = 1$ in the formula (e).

Hence a ratio exists between the active volume $D_1$ of the liquid pressure motor 23 and that $D_2$ of the liquid pressure motor 24. That is, a ratio R the tthe two capacities is obtained from the above formula (f) as given below wherein $$R = D_1/D_2 = 1/\eta_1 \cdot \eta_2 \tag{g}$$

When the formula (g) is satisfied, the output torque $T_3$ of the liquid pressure motor 23 and the input torque $T_4$ of the liquid pressure motor 24 are balanced with the result of stopping their rotation. Thus, the capacity ratio R between the two liquid pressure motors 23 and 24 is given when $$R > 1/\eta_1 \cdot \eta_2 \tag{h}$$

It is possible to give a rotary movement to the winding drum 22 in the direction of winding or unwinding by rotating the liquid pressure motor 24 forcibly by the liquid pressure motor 23 in the same direction thereof.

In this case, the torque $T_2$ of the winding drum 22 is given by the formula $$T_2 = 1/2\pi \cdot (D_1 \cdot P_1 \cdot \eta_1 - D_2 \cdot P_2 \cdot 1/\eta_2) \tag{i}$$

which is obtained when $T_2 = T_3 - T_4$ in the above formulas (c) and (d). Also in this case the pressure $P_1$ at the inlet of the liquid pressure motor 23 and the pressure $P_2$ at the discharge of the liquid pressure motor 24 doing the pump action are considered approximately equal to the discharge pressure P of the liquid pressure pump 21. Thus, the relation $$T_2 = 1/2\pi \cdot (D_1 \cdot \eta_1 - D_2 \cdot 1/\eta_2) \cdot P \tag{j}$$

is obtained. On the other hand, the rpm $N_2$ of the winding drum 22 at that time is given by the formula $$N_2 = \frac{Q}{\frac{D_1}{\eta_3} - D_2 \cdot \eta_4} \tag{k}$$

since the operating liquid discharged from the liquid pressure motor 24 performing the pump action is fed together with that from the liquid pressure pump 21 to the inlet of the liquid pressure motor 23. In the end, a ratio of such revolutions with the two position valve 33 set in the left position and those with the same valve set in the right position is given by the formula $$S = \frac{N_2}{N_1} = \frac{\frac{D_1}{\eta_3} + \frac{D_2}{\eta_4}}{\frac{D_1}{\eta_3} - D_2 \cdot \eta_4} \tag{1}$$

which is obtained from the above formulas (b) and (k). If the two liquid pressure motors 23 and 24 used herein are of the same type, it may be considered that $\eta_3 = \eta_4 = \eta_v$, and a ratio between the volumes of the two liquid pressure motors 23 and 24 is expressed by $D_1/D_2 = R$, as given above. Therefore, the formula (1) is written as $$S = D_1 + D_2/(D_1 - _{D2}) \cdot \eta_v^2 = R + 1/R - \eta_v^2 \tag{m}$$

In this formula (m) the volume efficiency $\eta_v$ of the two motors 23 and 24 is always less than one or $\eta_v < 1$, while the volume ratio R is greater than one or $R < 1$. Thus, the speed ratio S cannot become infinite but is given as a function of the volume ratio R between the two liquid pressure motors 23 and 24. On the other hand, relations $$T_1 \times N_1 = T_2 \times N_2$$

$$T_1/T_2 = N_2/N_1 \: S = R + 1/R - \eta_v^2 \tag{n}$$

are established from the aspect of constant horsepower. Thus, if a ratio of the maximum torque $T_1$ max required at low speed to the minimum torque $T_2$ min required at high speed is determined, the volume ratio R between the two liquid pressure motors 23 and 24 to be used may be found from the foregoing formula (n). The type of the two liquid pressure motors 23 and 24 may be determined by a sum of the active volumes $D_1$ and $D_2$ thereof to be found from the maximum torque $T_1$ max required and the volume ratio R therebetween. If the volume ratio R is determined, the minimum torque $T_2$ min must be naturally determined.

Thus, for example, with the two liquid pressure motors 23 and 24 having $\eta_t = \eta_1 = \eta_2 = 95$ percent and $\eta_v = \eta_3 = \eta_4 = 98$ percent, taking into consideration that a volume efficiency $\eta_v$ of a liquid pressure motor used commonly is 95 to 98 percent and a mechanical efficiency thereof $\eta_t$ 90 to 95 percent, and with a volume efficiency R between the same motors 23 and 24 given so as to satisfy the foregoing formula (h) or $R = 1.11 > 1/0.95^2$, a speed ratio S, when the two position valve 33 is moved to the left position, is given by $$S = 1.11 + 1/1.11 - 0.98^2 = 14.1$$

which is obtained from the foregoing formula (m). This means that a speed ratio of about 14 to 1 can be obtained. The torque efficiency and volume efficiency of each of the two liquid pressure motors 23 and 24 are adequately given with a volume ratio R therebetween taken so as to satisfy $R > 1/\eta_1 \cdot \eta_2$. In the embodiment in FIG. 1, the rotary speed of the winding drum 22 may be increased two or three to ten or more times, as will be understood from the foregoing formulas (a) and (j), by moving the two position valve 33 from the right to the left position, even through the output torque of the winding drum 22 is lowered.

Figure 9:
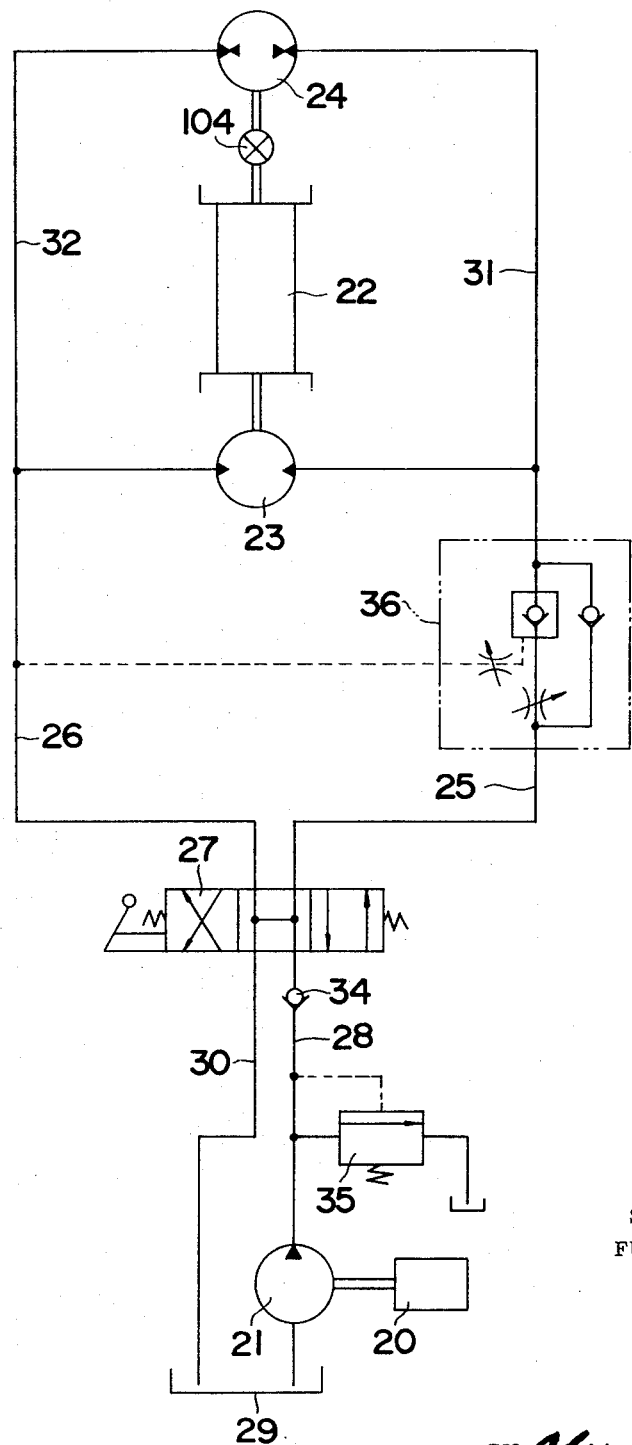
FIGS. 9, 10 and 11 are liquid pressure circuit diagrams showing other embodiments of this invention respectively.
Figure 10:
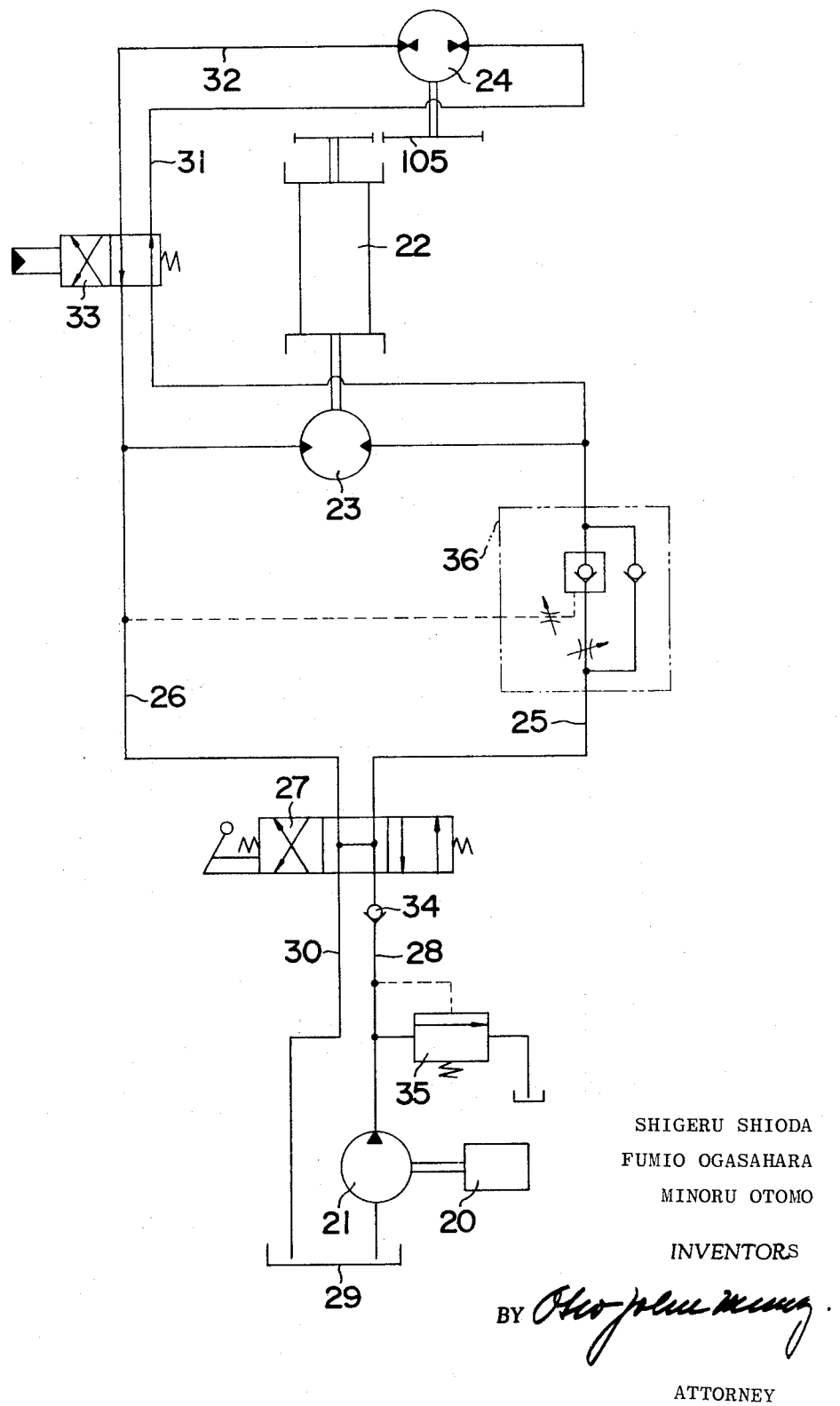
Figure 11:
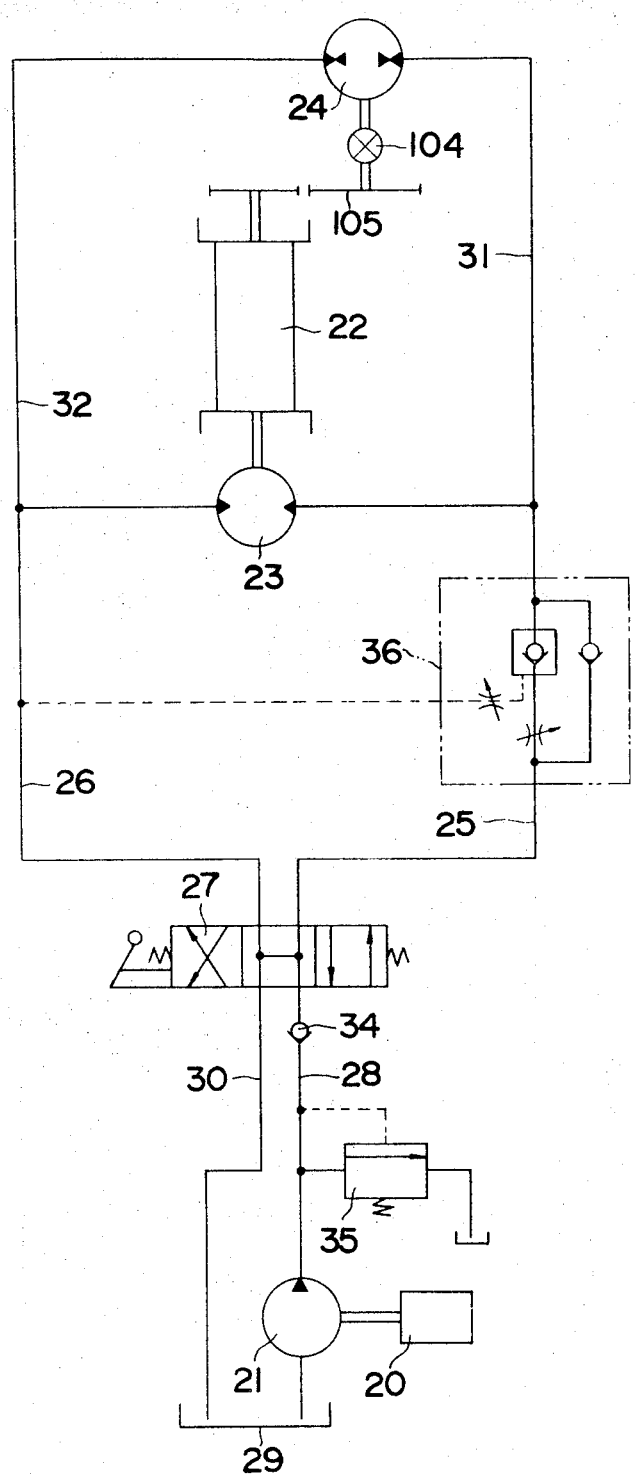

Furthermore, the change-over valve 33 is used to change over the connection of the liquid pressure motor 24 to the liquid pressure motor 23 in the embodiment of FIG. 1, but this may be satisfied by changing only the driving direction of one one liquid pressure motor 24 in both ways forward and reverse with that of other liquid pressure motor 23 kept unchanged for the winding drum 22. Thus, quite the same operation and effect can be achieved by providing a reversible clutch 104 between the winding drum 22 and the liquid pressure motor 24 so that the direction of rotation of the liquid pressure motor 24 with respect to the liquid pressure motor 23 may be changed by the clutch 104. In the embodiments of FIGS. 1 and 9, as described above, there must be a difference between the volumes of the liquid pressure motors 23 and 24. This means that a specific difference in volume between the two motors 23 and 24 is required for one revolution of the winding drum 22 as a load member. Accordingly, in embodiments of FIGS. 10 and 11 as well as in the modifications of FIGS. 1 and 9 respectively, in order to have the same volume for the liquid pressure motors 23 and 24, a reduction mechanism 105 is provided between the winding drum 22 and the liquid pressure motor 24.

Figure 12:
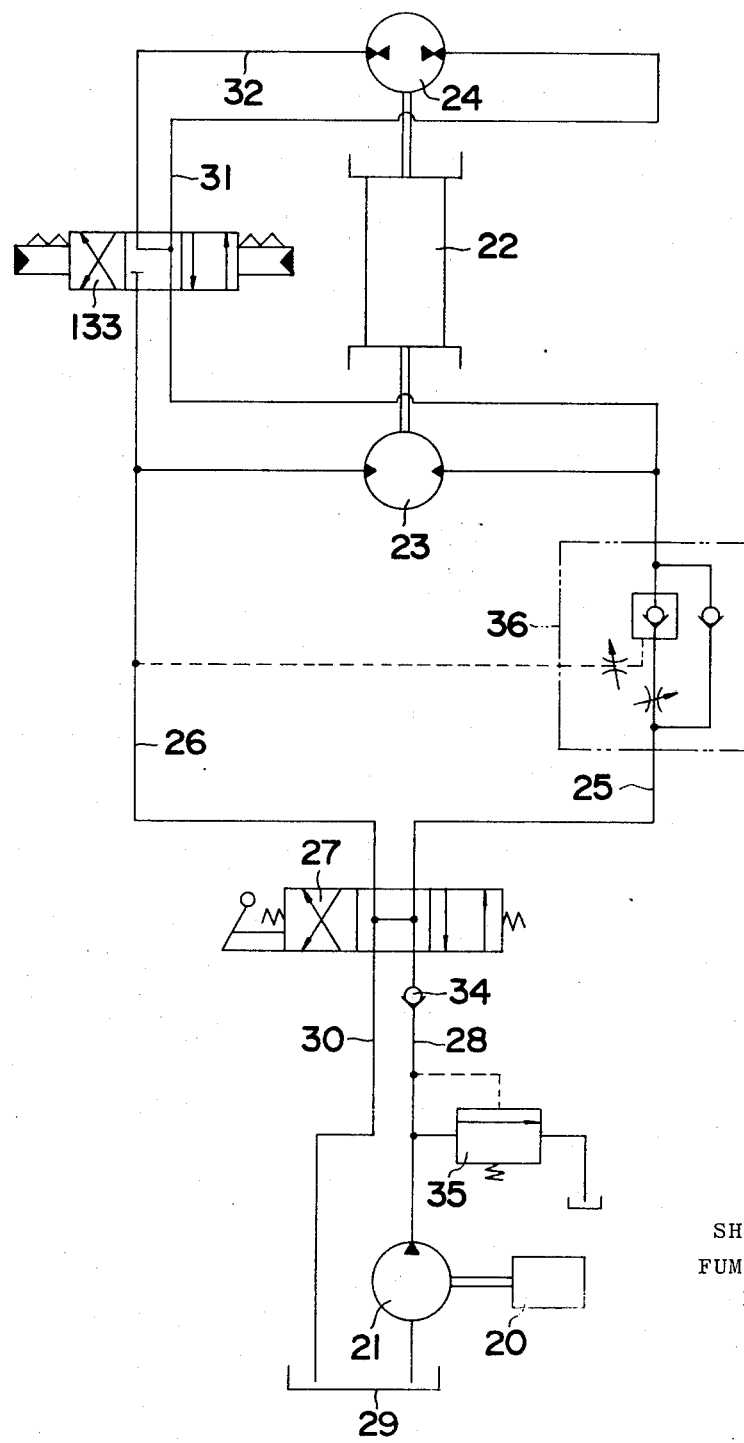
FIG. 12 is a liquid pressure circuit diagram of a three-speed change type liquid pressure driving device of this invention.

Still furthermore, it is possible to change the rotary speed at three or more stages instead of two stages as in FIGS. 1, 9, 10 and 11. This is illustrated in embodiments of FIGS. 12, 14, 15 and 16. In the embodiment of FIG. 12 the two-way valve 33 of the embodiment of FIG. 1 is replaced by an open center three-position valve 133. In this embodiment the rotary speed of the winding drum 22 can be changed to two stages by moving the three position valve 133 to the right or left position from the position shown just as in the case of FIG. 1. In addition, when it is set in the center position, the circuits 31 and 32 with respect to the liquid pressure motor 24 connect with the main circuit 25 so as to bring the liquid pressure motor 24 into a state where its idle condition may be achieved. Thus, only the liquid pressure motor 23 is driven to rotation by the liquid pressure pump 21. The torque $T_3$ of and rpm $N_3$ of the winding drum are given by the formulas $$T_3 = 1/2\pi \cdot D_1 \cdot \eta_1 \cdot P \tag{p}$$

$$N_3 = \frac{Q}{\dfrac{D_1}{\eta_3}} \tag{q}$$

As understood from comparison between these formulas (p) and (q) and the foregoing formulas (a) and (b) or (j) and (k), the winding drum 22 is driven to rotate at an intermediate torque and rotary speed. In this manner the rotary speed of the winding drum 22 can be selected at three stages by change-over operation of the three position valve 133.

Figure 13:
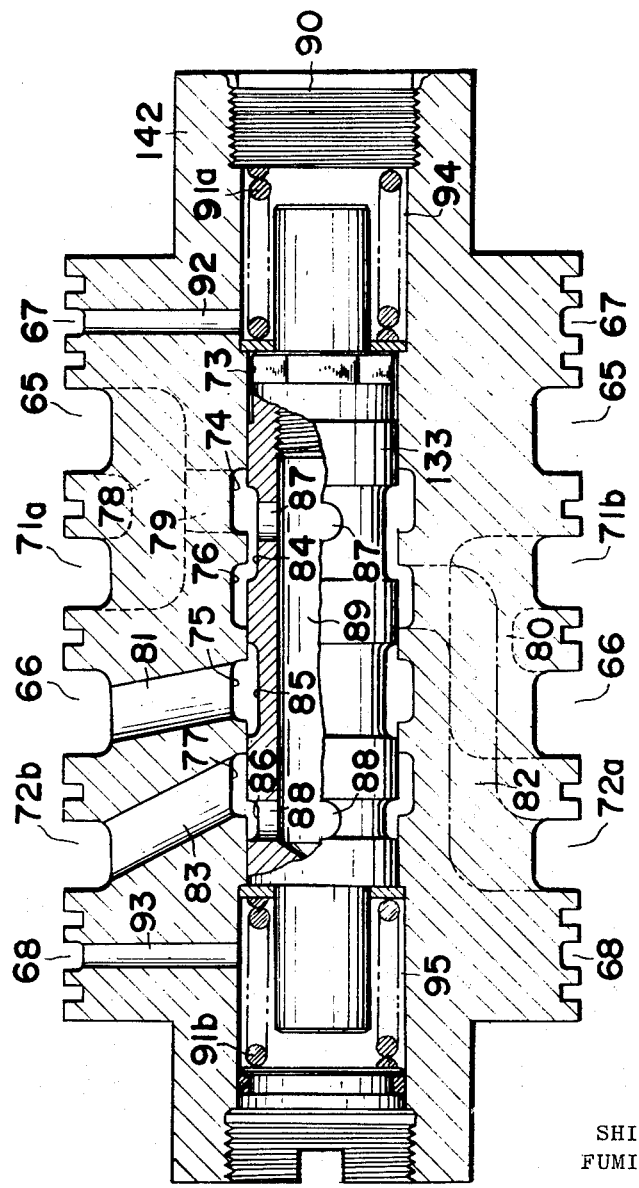
FIG. 13 is a front view in vertical section showing a modified form of the rotary valve for the liquid pressure motor of FIG. 2, which is used in such a circuit.

In the embodiment of FIG. 12 such a two-throw liquid pressure motor arrangement having a two way valve as described above may also be employed as in connection with the two liquid pressure motors 23 and 24. For this purpose, the two position valve 33 and the rotary valve 42 in the two-throw star-shaped liquid pressure motor shown in FIGS. 2 to 8 may be substituted for the three position valve 133 and the rotary valve 142 shown in FIG. 13, with center springs 91a and 91b provided provided at both sides of the three position valve 133. With such an arrangement the three position valve 133 is retained in the center position, as shown in FIG. 13, by the force of springs 91a and 91b at the right and left thereof as long as pilot ports 100 and 101 are retained open to the reservoir. Under this condition the semi-annular groove 71a communicating with the liquid pressure motor 23 connects with the port 98 via through hole 78 and through the annular groove 65, while the semi-annular groove 71b connects with the port 99 via through hole 80 and through the annular groove 66. The semi-annular grooves 72a and 72b that are related to the liquid pressure motor 24 connect with the port 98 via through hole 82, annular groove 76, annular groove 84, and via through hole 83, annular groove 77, annular groove 86, through hole 88, center hole 89, through hole 79, through hole 78, annular groove 65, through annular groove 74, through hole 79, through hole 78 and annular groove 65, whereby only the liquid pressure motor 24 is held in its idle condition. On the other hand, when the valve 133 is moved to the left or right by giving a pilot pressure to the pilot port 11 or 101, the semi-annular grooves 71a and 71b that lead to the liquid pressure motor 23 are kept in communication with the ports 98 and 99 without any change. In the former case only the semi-annular grooves 72a that led to the liquid pressure motor 24 connect with the port 98 via through hole 82, annular groove 76, annular groove 84, annular groove 74, through hole 79, through hole 78, annular groove 65, while the semi-annular groove 72b connects with the port 99 via through hole 83, annular groove 77, annular groove 85, annular groove 75, through hole 81 and annular groove 66. In the latter case the semi-annular groove 72a connects reversely with the port 99 via through hole 82, annular groove 76, annular groove 85, annular groove 75, through hole 81 and annular groove 66, while the semi-annular groove 72b connects with the port 98 via through hole 83, annular groove 77, annular groove 86, through hole 88, center hole 89, through hole 87, annular groove 84, annular groove 74, through hole 79, through hole 78 and annular groove 65. In this manner connections of the liquid pressure motor 24 to the liquid pressure motor 23 can be changed in two ways, forward and reverse.

Figure 14:
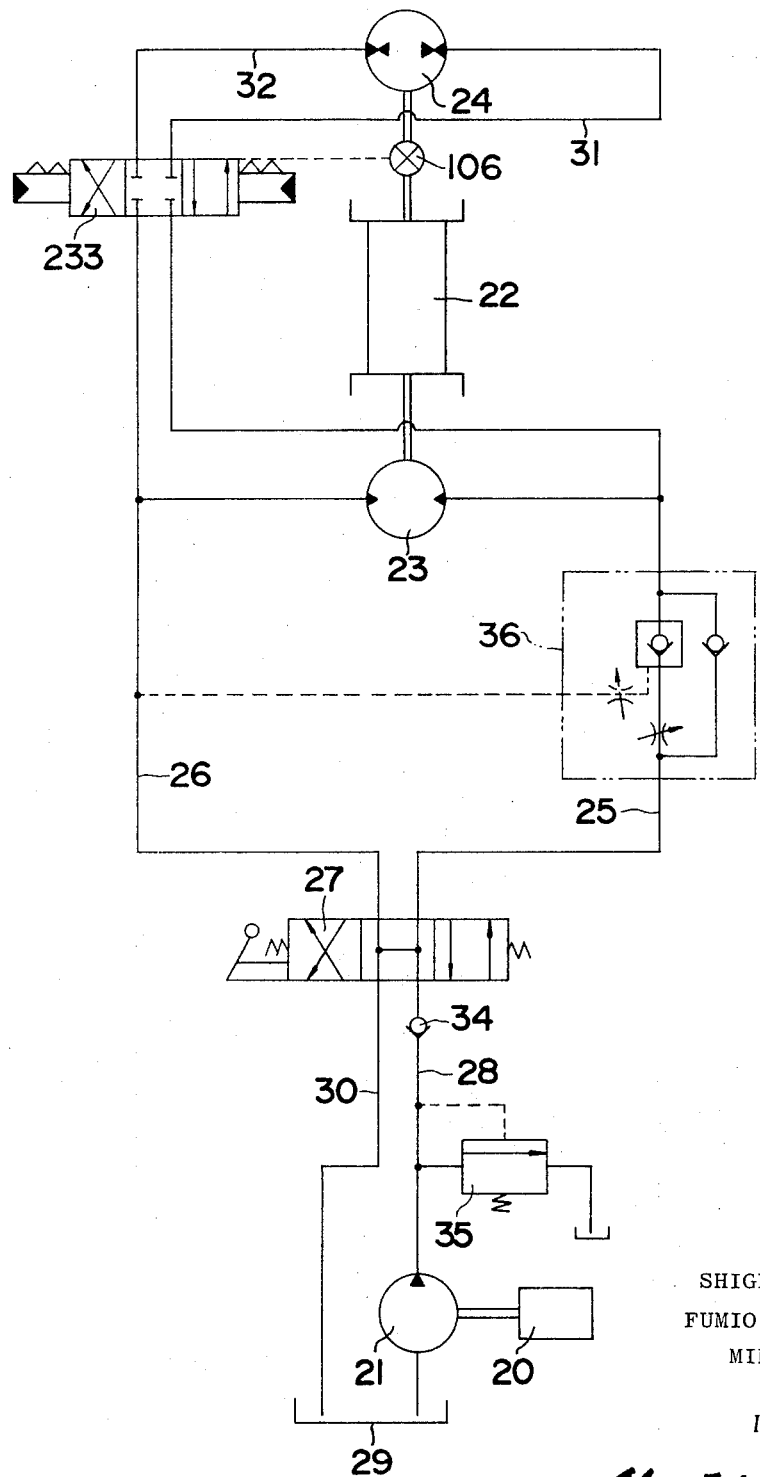

In the embodiment of FIG. 14 a closed center three-position valve is used, instead of the open center three-position valve 133 in FIG. 12. The valve 233 is provided with an interrupting clutch 106 between the winding drum 22 and the liquid pressure motor 24. The interrupting clutch 106 is interconnected to the valve 233 so as to be operated only when the valve 233 is set in the center position. In this case the winding drum 22 is disconnected from the liquid pressure motor 24 by setting the valve 233 to the center position when the interrupting clutch 106 is only operated, and as a result the winding drum 22 is driven to rotate by the liquid pressure motor 23 with the liquid pressure motor 24 being put into idle condition. Thus, likewise in the embodiment of FIG. 12 it is possible to select the rotary speed of the winding drum 22 at three stages by operation of the valve 233.

Figure 15:
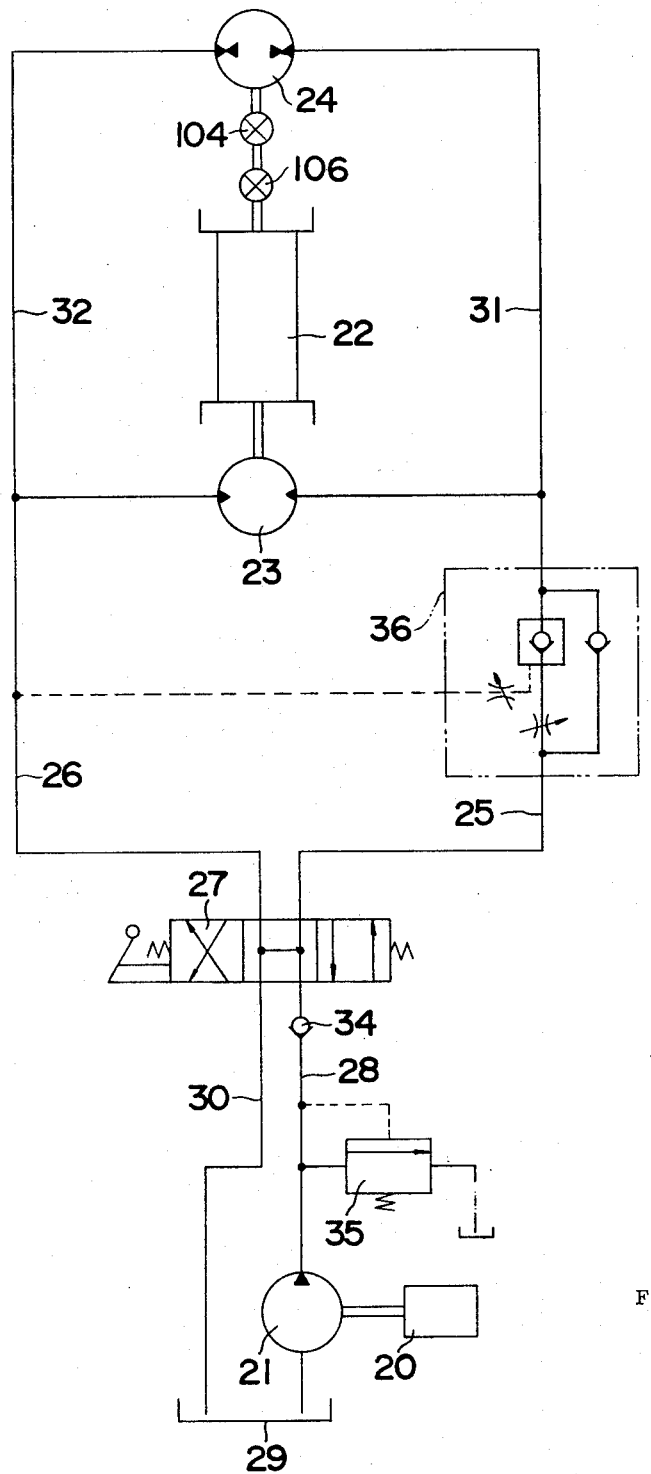

In the embodiments of FIGS. 12 and 14 and also in the embodiment of FIG. 9 the valves 133 and 233 may be replaced by a forward and reverse clutch 104. The interrupting clutch 106 (which may be so arranged as to form an integrated clutch) is in series between the winding drum 22 and the liquid pressure motor 24, as shown in FIG. 15, whereby it is possible to select the rotary speed of the winding drum 22 likewise at three stages by selective operation of such clutches. Furthermore, in these embodiments the liquid pressure motors 23 and 24 in order to have the same volume may be used in conjunction with a reduction mechanism that is provided between the winding drum 22 and the liquid pressure motor 24, which arrangement is similar to that disclosed in the embodiments of FIGS. 10 and 11.

Still further, in the embodiment of FIG. 16 two liquid pressure motors 24a and 24b are employed instead of the single liquid pressure motor 24. These motors are connected to the liquid pressure motor 23 in parallel through valves 33a and 33b respectively in conjunction with the winding drum 22 through an interlocking mechanism 107 with a sum of active volumes $D_a$ and $D_b$ of the two motors 24a and 24b being made smaller than that $D_1$ of the liquid pressure motor 23 per revolution of the winding drum 22. In this respect this is different from the foregoing embodiments. In other words, with such arrangement the torque $T_1$ and rpm $N_1$ of the winding drum 22 are given by $$T_1 = 1/2\pi \cdot (D_1 \cdot \eta_1 - D_a \cdot 1/\eta_5 + D_b \cdot \eta_6) \cdot P$$

$$N_1 = \frac{Q}{\frac{D_1}{\eta_3} - D_a \cdot \eta_7 + \frac{D_b}{\eta_8}}$$

where $\eta_5$ and $\eta_6$ are torque efficiencies of the liquid pressure motors 24a and 24b, and $\eta_7$ and $\eta_8$ are volume efficiencies of the same motors. Under the condition where both the valves 33a and 33b are set to the right position, the torque $T_2$ and rpm $N_2$ of the winding drum 22 are given by $$T_2 = 1/2\pi \cdot (D_1 \cdot \eta_1 - D_a \cdot 1/\eta_5 + D_b \cdot \eta_6) \cdot P$$

$$N_2 = \frac{Q}{\frac{D_1}{\eta_3} - D_a \cdot \eta_7 + \frac{D_b}{\eta_8}}$$

On the other hand, if the change-over valve 33b is moved only to the left position, the torque $T_3$ and rpm $N_3$ of the winding drum 22 are given by $$T_3 = 1/2\pi \cdot (D_1 \cdot \eta_1 + D_a \cdot \eta_5 - D_b \cdot 1/\eta_6) \cdot P$$

$$N_3 = \frac{Q}{\frac{D_1}{\eta_3} + \frac{D_a}{\eta_7} - D_b \cdot \eta_8}$$

And if both of the valves 33a and 33b are moved to the left position, the torque $T_4$ and rpm $N_4$ of the winding drum are given by $$T_4 = 1/2\pi \cdot (D_1 \cdot \eta_1 - D_a \cdot 1/\eta_6) \cdot P$$

$$N_4 = \frac{Q}{\frac{D_1}{\eta_3} - D_a \cdot \eta_7 - D_b \cdot \eta_8}$$

In this manner it is possible to select the rotary speed of the winding drum 22 at four stages. Still further, if the liquid pressure motors 24a and 24b used in this case are of the same type, $D_a = D_b$ is obtained. Consequently, in case $\eta_5 = \eta_6$ and $\eta_7 = \eta_8$ $T_2 = T_3$ and $N_2 = N_3$ are established, and it is possible to select the rotary speed of the winding drum 22 at three stages. Also in the embodiment of FIG. 16 the valves 33a and 33b may be substituted for reversible clutches that are provided between the liquid pressure motors 24a and 24b and the interlocking mechanism 107. By selective change-over of such reversible clutches the rotary speed of the winding drum 22 may be changed at three or four stages. Particularly, in the embodiment of FIG. 16 it is possible to select the rotary speed of the winding drum 22 at still more stages by taking in account the concept of the embodiment of FIG. 12 or FIG. 14 or FIG. 15. In case the sum of volumes of the liquid pressure motors 24a and 24b is made smaller than the volume of liquid pressure motor 23, a transmission ratio of the interlocking mechanism 107 may be made one to one. On the other hand, by adequate choice of such a transmission ratio of the interlocking mechanism 107 the liquid pressure motors 23, 24a and 24b may have the same volume.

Heretofore the invention has been explained for the case where it is applied to winches driven by liquid pressure. However, it will be readily understood that the invention may be applied to other devices such as liquid pressure drivers for transmissions and the like.

Thus, the foregoing embodiments of this invention should not be understood in any limited sense. It will be clear that many other modifications may be made without departing from the spirit of the invention. Thus, all possible modifications in which the effect of this invention can be obtained substantially through the use of any device similar or equivalent to the device of this invention may be construed as covered by the following claim.

What is claimed is:

1. A liquid pressure driving device comprising in combination:
   a liquid pressure pump;
   a motor means;,
   said pump operatively driven and rotated by said motor means;
   a reservoir;
   a load member;
   at least a first liquid pressure motor and a second liquid pressure motor operatively coupled to said load member;
   a valve means selectively coupled to either of said first or second liquid pressure motor for selectively controlling the respective rotary direction of said first and second liquid pressure motors;
   a feeding circuit passage means connected to said liquid pressure pump;
   an additional valve means;
   said first liquid pressure motor connected in one operative condition to said feeding circuit passage means via said additional valve means; and
   a liquid drain passage means;
   said first liquid pressure motor connected in a second operative condition to said reservoir via said liquid drain passage means;
   said second liquid pressure motor operatively connected to the respective non-operative condition of said first liquid pressure motor.

2. A liquid pressure driving device according to claim 1 wherein said first liquid pressure motor has a different volume capacity than said second liquid pressure motor.

3. A liquid pressure driving device according to claim 1 wherein said first and second liquid pressure motors are structurally arranged as an integrated double liquid pressure motor.

4. A liquid pressure driving device according to claim 1, and including a reduction mechanism selectively coupled to either said first or said second liquid pressure motor and wherein each of said first and second liquid pressure motors has the same volume capacity.

5. A liquid pressure driving device according to claim 1 and including a reversible clutch member selectively coupled to either said first or said second liquid pressure motor.

6. A liquid pressure driving device according to claim 5 wherein said first liquid pressure motor has a different volume capacity than said second liquid pressure motor.

7. A liquid pressure driving device according to claim 5 wherein each of said first and second liquid pressure motors has the same volume capacity.

8. A liquid pressure driving device according to claim 1 wherein said first mentioned valve means is a two position valve.

9. A liquid pressure driving device according to claim 1 wherein said first mentioned valve means is a three position valve.

* * * * *